Aug. 26, 1969    J. W. SAVAGE    3,464,017
ELECTRICAL SQUARE WAVE GENERATING CIRCUIT
Filed June 24, 1966
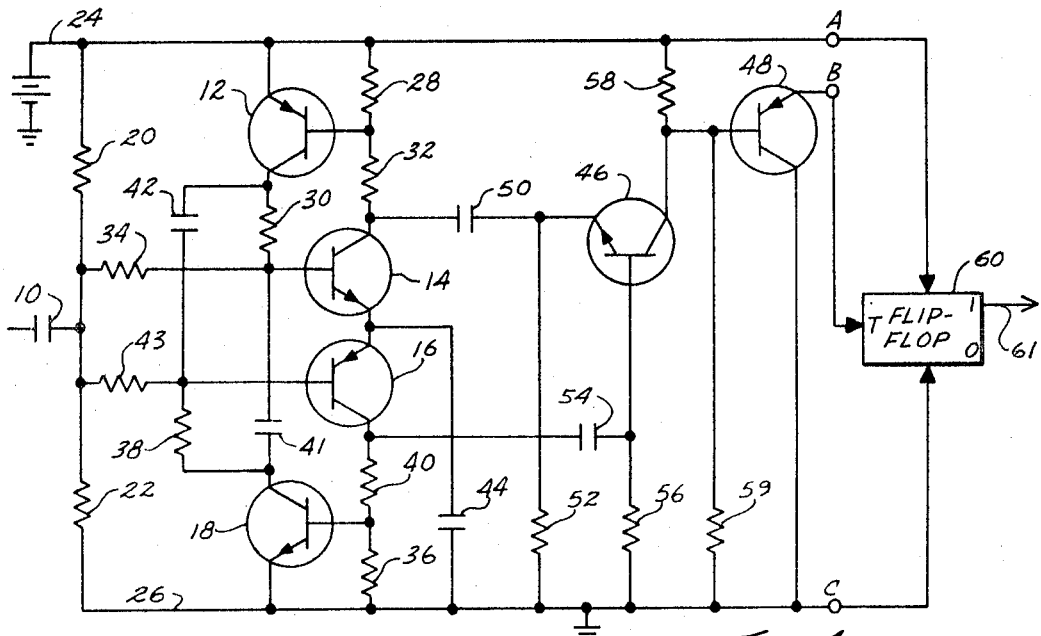
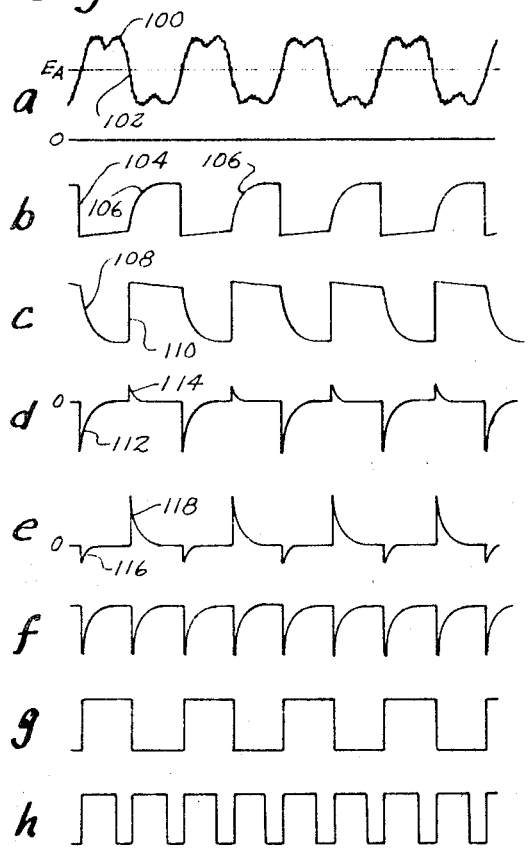
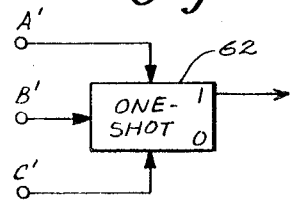
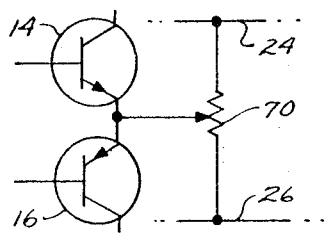
INVENTOR
JOHN W. SAVAGE
BY James N. Dresser
AGENT United States Patent Office 3,464,017
Patented Aug. 26, 1969

3,464,017
ELECTRICAL SQUARE WAVE GENERATING
CIRCUIT
John W. Savage, Bethesda, Md., assignor to The Susquehanna Corporation, a corporation of Delaware
Filed June 24, 1966, Ser. No. 560,290
Int. Cl. H03k 5/08
U.S. Cl. 328—34                                   5 Claims

ABSTRACT OF THE DISCLOSURE

The illustrative embodiment of the electrical squaring circuit receives noisy, varying input signals and reshapes them into an output pulse train. The input signals are applied to a highly-sensitive trigger circuit composed of two regenerative switches which operate in a complementary manner. Thus, one of them is on while the other is off, and vice versa. When the input waveform crosses through its average value, it turns off the switching circuit which is on, and turns on the one which is off. The output from this switching circuit is then passed through a gating circuit to a multivibrator which provides an output pulse train, each pulse being initiated when the switching circuit switches states.

This invention relates to an electrical circuit for generating pulses in response to a varying input signal. More particularly, this invention relates to a circuit for monitoring an electrical waveform and generating a pulse each time the waveform crosses through its average value, whether that average value be zero volts or some other value.

Much test result data are recorded as a train of digital pulses. In particular, these digital pulses might be recorded on magnetic tape which will later be played back to repeat the information contained therein. Because of the inability of the magnetic tape to record and accurately reproduce high-frequency signals, these pulses will appear distorted when played back from the magnetic tape. In essence, they appear as periodic signals comprised of a sine wave and several of its harmonics, but not as sharp pulses. Consequently, to enable these signals to operate digital equipment, it is first necessary to restore them in accurate digital form. Thus, it is necessary to convert this distorted wave into digital pulses which accurately repeat the pulse train which was initially recorded on the magnetic tape. As a first step in this conversion, the times at which the pulse train crosses its average value are detected and utilized to trigger pulse-forming circuitry.

There are other applications in which it is desirable to detect with a high degree of accuracy when a periodic signal passes through its zero value, or its average value where not zero. One such application is in phase or frequency comparison of two periodic waveforms. Many phase or frequency meters detect the zero crossing of the two waveforms under consideration, and determine their phase or time relationship by comparing the respective zero crossings of the two waves. The accuracy with which the phase or frequency comparison can be made is accordingly dependent upon the accuracy with which the zero crossings can be detected.

Accordingly, it is one object of the present invention to provide an improved circuit for detecting when a periodic waveform passes through its average value.

It is another object of the present invention to provide an improved circuit which is utilized in converting periodic waveforms into a digital pulse train.

It is a further object of the present invention to provide such a circuit which is utilized in generating a digital pulse train having one pulse for each transition of the periodic waveform through its average value.

Another object of the present invention is to provide an improved trigger circuit which can be triggered by a slowly rising input signal rather than requiring a sharp pulse transition as with the prior art.

These and other objects and advantages are achieved in the circuit of the subject invention in which the input signal is applied to a highly sensitive trigger circuit of unique design. This trigger circuit is made up of two regenerative switching circuits which operate in complementary manner. Thus, one of them is on while the other is off. When the input waveform crosses its average value, it turns off that switching circuit which was on, and this action causes the complementary switching circuit to turn on. The output from the switching circuit is passed through a gating circuit which produces an output pulse each time the circuit switches. The pulses from the gating circuit may be used as triggers for circuits which generate square waves or similar digital waveforms.

A further understanding of the subject invention will be obtained from the following detailed description and claims when considered in conjunction with the accompanying drawings, in which:

FIGURE 1 is a diagram, partially schematic and partially in block form, of a preferred embodiment of the subject invention.

FIGURE 2 contains representations of voltage waveforms found at different points in the subject invention.

FIGURE 3 is a block diagram of a monostable multivibrator which, when used in conjunction with FIGURE 1, results in a second embodiment of the subject invention.

FIGURE 4 shows a section of a schematic circuit which when utilized with FIGURE 1 gives an alternative embodiment of the invention.

FIGURE 1 depicts a preferred embodiment of the subject invention adapted to generate output pulses when an input signal passes through its average value. The input signal is applied through capacitor 10 which connects to a trigger circuit comprising transistors 12, 14, 16, and 18. Capacitor 10 is tied to the junction of resistors 20 and 22 which form a voltage divider between the positive potential found on line 24 and ground or common line 26. PNP transistor 12 and NPN transistor 14 are connected together to operate as a fast-acting switch. Transistor 12 has its emitter tied to line 24 and its base connected through resistor 28 to line 24. The collector of transistor 12 is connected through resistor 30 to the base of transistor 14 which has its emitter coupled through resistor 32 to the base of transistor 12. Transistor 14 also has its base connected through resistor 34 to input capacitor 10. Capacitor 42 is connected between the collector of transistor 12 and the base of transistor 16.

PNP transistor 16 and NPN transistor 18 are likewise connected as a fast-acting switch Transistor 18 has its emitter tied to common line 26 and its base connected through resistor 36 to the common line 26. The collector of transistor 18 is connected through resistor 38 to the base of transistor 16, which has its collector connected through resistor 40 to the base of transistor 18. The collector of transistor 18 is coupled through capacitor 41 to the base of transistor 14, while the base of transistor 16 is also connected through resistor 43 to input capacitor 10. The emitter of transistor 14 is tied directly to the emitter of transistor 16, and their junction is coupled through capacitor 44 to common line 26.

This trigger circuit feeds a gate circuit comprising transistors 46 and 48. The collector of transistor 14 is coupled through a differentiating circuit comprising capacitor 50 and resistor 52 to the emitter of transistor 46. Similarly, the collector of transistor 16 connects through the differentiating circuit made up of a capacitor 54 and resistor 56 to the base of transistor 46. The collector of transistor 46 is connected to the junction of resistors 58 and 59 which form a voltage divider between positive line 24 and common line 26. The collector of transistor 46 is also connected to the base of transistor 48 which has its collector tied to common line 18. The emitter of transistor 48 is connected via terminal B to the trigger input of bistable multivibrator 60. The multivibrator output on line 61 can be taken from either its one output, as shown, or its zero output.

It will be observed that the trigger circuit comprising transistors 12, 14, 16, and 18 operates as a free-running multivibrator. With no input applied through capacitor 10, the voltage divider comprising resistors 20 and 22 establishes the bias on the bases of transistors 14 and 16. Assume that transistors 12 and 14 are on and transistors 16 and 18 are off. Current flows through resistors 28 and 32 and through transistor 14, allowing capacitor 44 to charge. When capacitor 44 has charged sufficiently relative to the bias on the bases of transistors 14 and 16, transistor 14 comes out of saturation and transistor 16 commences to conduct. As a consequence, the current through resistors 28 and 32 decreases. Since these resistors determine the base bias of transistor 12, the decrease in current through resistors 28 and 32 increases the voltage on the base of transistor 12, causing it to come out of saturation. Therefore, the voltage on the base of transistor 14 decreases, bringing it further out of saturation. This regenerative action results in rapid switching off of the transistors 12 and 14.

Simultaneously, transistor 16 commences to conduct, and the voltage stored on capacitor 44 starts to discharge through transistor 16 and resistors 36 and 40. The current through resistor 36 determines the bias on the base of transistor 18, and so this current flow, while capacitor 44 is discharging, turns transistor 18 on. As a consequence, the voltage on the base of transistor 16 decreases, causing it to conduct more. Therefore, more current flows through resistors 36 and 40, further increasing the bias on the base of transistor 34. The regenerative action of these two transistors results in them rapidly switching on. The negative voltage pulse occurring at the collector of transistor 18 is accentuated by capacitor 41 and is then applied to the base of transistor 14, adding to the speed with which it turns off. Similarly, the negative pulse from the collector of transistor 12 as it turns off is accentuated by capacitor 42 and is then applied to the base of transistor 16, aiding it in turning on.

Once capacitor 44 has discharged through transistor 16 and resistors 36 and 40 to the point at which the voltage on capacitor 44 no longer holds transistor 16 in saturation, transistor 16 commences to shut off. At about this same point, transistor 14 commences to conduct. The regenerative action of the transistor switches takes place again; however, this time transistors 12 and 14 are rapidly turning on while transistors 16 and 18 are rapidly turning off. Again, capacitors 41 and 42 accentuate the voltage changes on the collectors of transistors 18 and 12, respectively, and applies these voltage charges to the bases of transistors 14 and 16, respectively. Thus, it is seen that in the absence of an input signal, the trigger circuit operates as a free-running multivibrator having a period determined by the values of resistors 28, 32, 36 and 40, and the value of capacitor 44.

Operation of the circuit of FIGURE 1 as a waveform squaring circuit, will now be described where it is desired to generate digital pulses at a rate equal to the rate of a distorted and noisy periodic input signal. FIGURE 2a depicts such an input signal. This signal waveform 100 is centered about some average voltage $E_A$ which may be zero volts but may be any other voltage, greater or less than zero volts. Waveform 100 is a distorted and noisy periodic waveform which, by way of example, may be one obtained when digital signals are recorded on magnetic tape and are then played back. Waveform 100 passes through its average value $E_A$ at regular intervals, and, when the waveform 100 represents the playback from digital data recorded on magnetic tape, these regular intervals correspond with the data pulses. The free-running period of the multivibrator, described above, must be longer than the period of the distorted periodic waveform 100. Preferably, the ratio of multivibrator to input signal period is just about a 1:1 ratio, although higher ratios are acceptable.

Assume that when waveform 100 is applied to input capacitor 10, transistors 16 and 18 are on, and transistors 12 and 14 are off. Input capacitor 10 removes the DC component $E_A$ from waveform 100, and the waveform is then centered about zero volts. When the waveform is applied to the base of transistor 16, the positive-going portion of the waveform causes transistor 16 to come out of saturation. The regenerative action, as described above, results in transistors 16 and 18 rapidly switching off. Simultaneously, the positive-going waveform, together with the positive voltage pulse through capacitor 41 as transistor 18 cuts off, causes transistor 14 to turn on, and regenerative action results in transistors 12 and 14 rapidly turning on. Consequently, current flows through resistors 24 and 28 and through transistor 22 to charge capacitor 44.

If it were not for the input waveform 100, capacitor 44 would eventually charge to the point at which transistor 14 comes out of saturation and transistor 16 commences to conduct, as happens when the trigger circuit operates as a free-running multivibrator. However, since the period of waveform 100 is less than the free-running period of the circuit, waveform 100 again passes through its average value, at point 102, before the free-running action occurs. A negative voltage is applied to the base of transistor 14, bringing it out of saturation. At the same time this negative voltage is applied to the base of transistor 16, and it commences to conduct. The regenerative action of transistors 12 and 14 results in them rapidly switching off, while the regenerative action of transistors 16 and 18 results in them rapidly switching on. Thus, the trigger circuit has changed its state in response to the input waveform 100.

When transistors 12 and 14 are off, the collector of transistor 14 is at the same potential as positive line 24. When transistor 14 turns on, the potential on its collector drops sharply to a voltage close to that on capacitor 44. When the transistor 14 next turns off, its collector potential rises back to the positive voltage on line 24, but due to capacitance effects, this rise is more gradual. FIGURE 2b depicts this voltage waveform on the collector of transistor 14 as it switches on and off in response to waveform 100. The negative transition 104 which occurs when transistor 14 turns on is very rapid, while the positive transition 106 as transistor 14 turns off is more gradual.

Similarly, the collector of transistor 16 is at nearly the same potential as capacitor 44 when that transistor is on, and when it switches off its collector drops to approximately ground potential. As depicted in FIGURE 2c, the voltage drop 108, occurring when transistor 16 turns off, is gradual due to capacitive loading, but the voltage rise 110 as the transistor 16 turns on is rapid.

Voltage on the collector of transistor 14 is differentiated by capacitor 50 and resistor 52 and is applied to the emitter of NPN transistor 46. Accordingly, the voltage applied to the emitter of transistor 46 is made up of alternating negative-going and positive-going pulses as depicted in FIGURE 2d. Because the voltage drop 104 is quite sharp, the negative pulse 112 resulting from its differentiation, is quite sharp and is of a magnitude substantially identical with the magnitude of voltage drop 104. However, since the voltage rise 106 is more gradual, positive pulse 114, resulting from its differentiation, is of a much smaller magnitude.

Similarly, the voltage on the collector of transistor 16 is differentiated by capacitor 54 and resistor 56 and is applied to the base of transistor 46. Differentiation of the gradual voltage drop 108 results in the small negative pulse 116 of FIGURE 2e; while differentiation of sharp voltage rise 114 gives the larger positive pulse 118.

Since transistor 14 turns on at the same time that transistor 16 turns off, voltage drop 104 and voltage drop 108 are initiated at the same time. Consequently, negative pulse 112 is applied to the emitter of transistor 48 at the same time that negative pulse 116 is applied to the base of the transistor. Since pulse 112 is of much greater magnitude than pulse 116, transistor 46 is biased on when these pulses are applied to it. It remains on for only the brief period of time which the pulse 112 exists. The collector of transistor 46 is normally at approximately the same potential as positive line 24. When transistor 46 is turned on by pulse 112, its collector potential drops sharply, but when transistor 46 again turns off after pulse 112 has passed, its collector potential again rises to the positive potential line 24.

Similarly, since transistor 16 turns on at the same time that transistor 14 turns off, positive pulses 114 and 118 are simultaneously applied to the emitter and the base respectively, of transistor 46. Since pulse 118 is of considerably greater magnitude than is pulse 114, transistor 46 is biased on when these pulses are applied to it. It remains on for the brief period of time during which pulse 118 exists, and again the potential on its collector experiences a sharp drop during the time it is on.

Each time the trigger circuit comprising transistors 12, 14, 16, and 18 changes state as a result of input waveform 100 passing through its average value, a negative pulse occurs at the collector of transistor 46. These pulses are applied to the base of transistor 48, which serves as an isolation amplifier, turning it on. The emitter of transistor 48 is normally at the positive potential of line 24. Each time transistor 48 turns on, its emitter drops to approximately ground potential, rising again when it turns off. Thus, as waveform 100 is applied to input capacitor 10, a series of negative pulses, as depicted in FIGURE 2f, is generated at the emitter of transistor 48.

The negative pulses from the emitter of transistor 48 trigger multivibrator 60. The multivibrator output is a series of digital pulses of the same period as the input waveform 100. This series of pulses is depicted in FIGURE 2g.

FIGURE 3 is a block diagram representation of a monostable multivibrator or one-shot 62, which can be utilized in place of the bistable multivibrator 60 in FIGURE 1. Removing the leads of the bistable multivibrator from terminals A, B, and C in FIGURE 1, and connecting the one-shot leads A', B', and C' to these corresponding terminals results in placing the one-shot in the circuit in place of the bistable multivibrator. Thus, each trigger pulse obtained from transistor 48 triggers the one-shot to its unstable state. The one-shot returns to its stable state before it is again triggered. Thus, the pulse repetition rate is twice the frequency of the input waveform 100, while the duration of the half-cycles is controlled by the internal multivibrator adjustment (not shown).

The trigger circuit comprising transistors 12, 14, 16 and 18 is particularly well adapted for sensing when input waveform 100 experiences a transition through its average value. Once such a transition occurs, the circuit triggers rapidly, due to the regenerative action of the two switching circuits within it. Whereas, a conventional Eccles-Jordan trigger circuit requires a fast-rising pulse to trigger it properly, the trigger circuit of the subject invention will operate when a slowly rising waveform, such as a sine wave, is applied to it. In addition, it has been shown that the trigger circuit which forms a part of the subject invention is capable of operation as a free-running multivibrator.

While FIGURE 1 shows capacitor 10 utilized as an input capacitor in the circuit, the circuit will operate equally well without an input capacitor, provided the bias determined by resistors 20 and 22 is properly adjusted. If a waveform having some average value $E_A$, which is not equal to zero volts, is applied directly to the junction of resistors 34 and 43, it will actuate the circuit. The average value of the voltage $E_A$ will be stored on capacitor 44 and transistors 14 and 16 will be triggered as the voltage on the base of each transistor varies from that voltage which is stored on capacitor 44. Thus the circuit triggers each time the input waveform passes through its average value, whether that average value be zero volts or some other voltage.

As a free-running multivibrator the rate of free-running is determined by the value of capacitor 44 and the values of resistors 28, 32, 36, and 40. Should it be desired to vary this free-running rate, then capacitor 44 can be made variable or, for example, resistor 32 and resistor 40 can be replaced by rheostats which are ganged to operate together, thus permitting variation of the current flowing through them. Since the free-running rate should be slightly slower than the frequency of the input signal to be handled, use of one of these techniques to permit variation of the free-running rate will permit use of the circuit with a variety of input-signal frequencies.

An alternative form of the trigger circuit formed of transistors 12, 14, 16 and 18 can be constructed by replacement of capacitor 44 with a bias source as shown in FIGURE 4. Potentiometer 70 is connected across the supply lines 24, 26 and the contact of this potentiometer is connected to the junction point of the emitters of transistors 14, 16. The potentiometer 70 establishes a fixed bias line about which the trigger circuit operates. If the potentiometer 70 is adjusted to make the voltage on the emitters of transistors 14, 16 equal to the DC level of the input signal, the circuit will be triggered each time the input waveform passes through its average value, as with the trigger circuit of FIGURE 1.

At other potentiometer voltages, the trigger circuit would switch at other than the average value of the input signal, but at essentially the same voltage level for both positive and negative excursions of such input. However, when used with the complete system of FIGURE 1 the output would not be as depicted in waveforms 2g or 2h. Because the fixed bias line would be either above or below $E_A$, with an input such as shown in 2a, it would result in uneven on-off times for the trigger circuit of transistors 12, 14, 16 and 18, and the trigger pulses 2f which drive the output multivibrator 60 or 62 would not be evenly spaced. Nevertheless, the circuit of FIGURE 1, as modified by the circuit of FIGURE 4, finds utility by being able to produce an output pulse train having its pulse transitions determined by the points where the input waveform crosses the fixed bias level. The trigger circuit itself, as modified, functions as a bistable multivibrator or a Schmitt trigger.

While transistors of particular conductivity types have been shown, these of course can be reversed with a corresponding reversal in battery potential and diode polarity. Although this invention has been described with reference to illustrative embodiments thereof, it will be apparent to those skilled in the art that the principles of this invention can be embodied in other forms but within the scope of the claims.

What is claimed is:

1. An electrical circuit adapted to receive a varying input signal having an average value and for generating an output pulse train, each pulse being generated when said input signal passes through its average value, said circuit comprising:

(a) a trigger circuit capable of assuming either one of two states, and including:
  (1) voltage storage means for averaging the varying level of said input signal;
(b) means for applying said input signal to said trigger circuit;
(c) said trigger circuit assuming the first of said states when said input signal is greater than said average value, said trigger circuit assuming the second of said states when said input signal is less than said average value;
(d) a gate circuit connected to said trigger circuit for producing monodirectional voltage pulses each time said trigger circuit changes from one of its states to the other of its states; and
(e) a multivibrator connected to said gate circuit to be driven thereby and generate said output pulse train.

2. An electrical circuit as claimed in claim 5 wherein said multivibrator is a bistable multivibrator.

3. An electrical circuit as claimed in claim 5 wherein said multivibrator is a monostable multivibrator.

4. An electrical circuit as claimed in claim 1 wherein said trigger circuit further includes:
(a) first and second means for connecting said trigger circuit to a bias voltage source;
(b) first switching means connected between said first connecting means and said voltage storage means; and
(c) second switching means connected between said second connecting means and said voltage storage means.

5. An electrical circuit as claimed in claim 4 wherein said trigger circuit further includes:
(a) each of said switching means having a first transistor of one conductivity type and a second transistor of an opposite conductivity type, said transistors connected to function as a regenerative switch.

References Cited

UNITED STATES PATENTS

| | | | |
|---|---|---|---|
| 2,902,674 | 9/1959 | Billings et al. | 307—267 X |
| 3,191,073 | 6/1965 | Mooney | 307—290 X |
| 3,268,738 | 8/1966 | Deavenport | 307—288 X |

JOHN S. HEYMAN, Primary Examiner

B. P. DAVIS, Assistant Examiner

U.S. Cl. X.R.

307—247, 260